United States Patent
Pieczul

(10) Patent No.: US 10,380,340 B2
(45) Date of Patent: Aug. 13, 2019

(54) BEHAVIORAL MODEL BASED ON SHORT AND LONG RANGE EVENT CORRELATIONS IN SYSTEM TRACES

(71) Applicant: International Business Machines Corporation, Armonk, NY (US)

(72) Inventor: Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 15/045,292

(22) Filed: Feb. 17, 2016

(65) Prior Publication Data

US 2016/0239596 A1 Aug. 18, 2016

Related U.S. Application Data

(63) Continuation of application No. 14/623,990, filed on Feb. 17, 2015.

(51) Int. Cl.
*G06F 21/56* (2013.01)
*G06Q 30/02* (2012.01)

(52) U.S. Cl.
CPC .......... *G06F 21/566* (2013.01); *G06Q 30/02* (2013.01); *G06F 2221/034* (2013.01)

(58) Field of Classification Search
CPC ........ G06F 21/566; G06F 21/56; G06F 21/55; G06F 2221/034
See application file for complete search history.

(56) References Cited

U.S. PATENT DOCUMENTS

| | | | |
|---|---|---|---|
| 7,594,260 | B2 | 9/2009 | Porras et al. |
| 8,225,402 | B1 | 7/2012 | Averbuch et al. |
| 8,271,403 | B2 | 9/2012 | Rieck et al. |
| 8,381,299 | B2 | 2/2013 | Stolfo et al. |
| 8,620,842 | B1 | 12/2013 | Cormack |
| 9,329,980 | B2 | 5/2016 | Baril et al. |
| 2014/0096249 | A1 | 4/2014 | Dupont et al. |
| 2016/0164901 | A1 | 6/2016 | Mainieri et al. |

(Continued)

OTHER PUBLICATIONS

Sultana, A. et al., "An Improved Hidden Markov Model for anomaly detection using frequent common patterns", IEEE ICC 2012, Communication & Info. Sys. Security Symp., pp. 1113-1117 (2012).

(Continued)

*Primary Examiner* — Jay Hann
(74) *Attorney, Agent, or Firm* — Daniel R. Simek

(57) ABSTRACT

A method of generating a behavioral model of a computer system. A processor partitions a system log of process events into a plurality of strands sharing common characteristics. The processor selects attributes from the strands and generates first distinct n-grams that include attributes from successive events within a strand. The processor generates a first plurality of n-gram groups, each including a plurality of the first distinct n-grams in which a first one of the plurality of first distinct n-grams coexists in a strand also containing a second one of the plurality of first distinct n-grams. The processor generates a first plurality of n-gram group arrangements, each containing a plurality of n-gram groups, and each of the n-gram groups included, in combination, in at least one strand, and the behavioral model containing the first distinct n-grams, the first plurality of n-gram groups, and the first plurality of n-gram group arrangements.

6 Claims, 10 Drawing Sheets

(56) References Cited

U.S. PATENT DOCUMENTS

2016/0226890 A1    8/2016    Harang

OTHER PUBLICATIONS

Zolotukhin, M. & Hamalainen, T., "Detection of Zero-day Malware Based on the Analysis of Opcode Sequences", 11th Annual IEEE CCNC Security Privacy & Content Protection, pp. 386-391 (2014). List of IBM Patents or Patent Applications Treated as Related, Appendix P, Filed Herewith.
Olgierd S. Pieczul, et al., "Behavioral Model Based on Short and Long Range Event Correlations in System Traces", U.S. Appl. No. 14/623,990, filed Feb. 17, 2015.
Forrest et al., "A Sense of Self for Unix Processes", Proceedings 1996 IEEE Symposium on Security and Privacy, May 6-8, 1996, Oakland, CA, pp. 120-128, DOI: 10.1109/SECPRI.1996.502675.
Forrest et al., "The Evolution of System-Call Monitoring", 2008 Annual Computer Security Applications Conference, ACSAC 2008, pp. 418-430, DOI: 10.1109/ACSAC.2008.54.
Mao et al., "Web Mimicry Attack Detection Using HTTP Token Causal Correlation", International Journal of Innovative Computing, Information and Control vol. 7, No. 7(B), Jul. 2011, pp. 4347-4362, ICIC International, © 2011 ISSN 1349-4198.
Parekh et al., "Privacy-Preserving Payload-Based Correlation for Accurate Malicious Traffic Detection", Department pf Computer Science Columbia University, provided in search report dated Sep. 10, 2014, < http://www.cs.columbia.edu/~janak/research/2182177792Isad.pdf>.
Pieczul et al, "Collaborating as normal: detecting systemic anomalies in your partner", 22nd International Workshop on Security Protocols, Cambridge, UK, 2014, provided by inventor on Aug. 8, 2014.
Pieczul et al, "Discovering Emergent Norms in Security Logs", 6th Symposium on Security Analytics and Automation 2013, pp. 438-445, DOI: 10.1109/CNS.2013.6682758.
Raman, Preeti, "JaSPIn: JavaScript based Anomaly Detection of Cross-site scripting attacks" (Thesis), Carleton University, Ottawa, Ontario, Sep. 2008, pp. i-99, © Copyright by Preeti Raman, 2008.
Wagner et al., "Mimicry Attacks on Host-Based Intrusion Detection Systems*", (*This research was supported in part by NSF Career CCR-0093337), CCS'02, Nov. 18-22, 2002, Washington, DC, USA, Copyright 2002 ACM 1-58113-612-9/02/011.
Wang et al., "Anagram: A Content Anomaly Detector Resistant to Mimicry Attack1", (1 This work has been partially supported by a grant with the Army Research Office, No. DA W911NF-04-1-0442, provided in search report dated Sep. 10, 2014, <http://www.covert.io/research-papers/security/Anagram%20-%20A%20Content%20Anomaly%20Detector%20Resistant%20to%20Mimicry%20Attack.pdf>.
Warrender et al., "Detecting Intrusions Using System Calls: Alternative Data Models", Proceedings IEEE Symposium on Security and Privacy, 1999, pp. 133-145, DOI: 10.1109/SECPRI.1999.766910.
"N-gram", Wikipedia, the free encyclopedia, this page was last modified on Dec. 11, 2014, printed on Jan. 23, 2015, <http://en.wikipedia.org/wiki/N-gram>.
List of IBM Patents or Patent Applications Treated as Related, Appendix P, Filed Herewith, 2 pages.

| 413 N-GRAM 13 | | |
|---|---|---|
| ATTR 31 | ATTR 32 | ATTR 33 |

| 418 N-GRAM 18 | | |
|---|---|---|
| ATTR 37 | ATTR 38 | ATTR 39 |

| 414 N-GRAM 14 | | |
|---|---|---|
| ATTR 29 | ATTR 30 | ATTR 31 |

| 419 N-GRAM 19 | | |
|---|---|---|
| ATTR 39 | ATTR 40 | ATTR 41 |

| 415 N-GRAM 15 | | |
|---|---|---|
| ATTR 28 | ATTR 29 | ATTR 30 |

| 420 N-GRAM 20 | | |
|---|---|---|
| ATTR 36 | ATTR 37 | ATTR 38 |

| 416 N-GRAM 16 | | |
|---|---|---|
| ATTR 30 | ATTR 31 | ATTR 32 |

| 421 N-GRAM 21 | | |
|---|---|---|
| ATTR 35 | ATTR 36 | ATTR 37 |

| 417 N-GRAM 17 | | |
|---|---|---|
| ATTR 32 | ATTR 33 | ATTR 34 |

| 422 N-GRAM 22 | | |
|---|---|---|
| ATTR 38 | ATTR 39 | ATTR 40 |

FIG. 4

BEHAVIORAL MODEL BASED ON SHORT AND LONG RANGE EVENT CORRELATIONS IN SYSTEM TRACES

FIELD OF THE INVENTION

The present invention relates to the generation of a behavioral model using a system log of a computer system based on past or "normal" behavior of the computer system and to the detection of anomalies between current or "new" activity and past or "normal" activity of the computer system using the generated behavioral mode

BACKGROUND OF THE INVENTION

In data processing security, anomaly detection is a technique of comparing new activity in a computer system with known "normal" activity patterns in the computer system. Typically, normal activity is learned from past operation of the computer system. Various prior art techniques differ in the model of "normal" behavior they use.

N-grams are useful in implementing approximate matching of current activity and past activity of the computer system. Further information about n-grams can be found at http://en.wikipedia.org/wiki/N-gram. In the past, it has been shown that n-gram models can be used to implement anomaly detection.

Stephanie Forrest, Steven A. Hofmeyr, Anil Somayaji and Thomas A. Longstaff, "A Sense of Self for Unix Processes", Proceedings of the 1996 IEEE Symposium on Security and Privacy (SP '96), IEEE Computer Society, Washington, D.C., USA, 120, discloses a method for anomaly detection in which "normal" is defined by short-range correlations in system calls of a process. An n-gram model is built from a trace of system calls as representing a system's normal behavior. The n-gram model records short-range correlations between system calls under normal operation.

A model of behavior as a single database of n-grams is rather coarse-grained. Whilst a computer system may run a number of distinct processes, only a single, amalgamated behavior of the entire computer system is captured. This reduces the accuracy of determining anomalies because any input sequence is matched to all of known sub-sequences, regardless of whether they ever appear in this arrangement.

Warrender C., Forrest S. and Pearlmutter B., "Detecting intrusions using system calls: alternative data models", IEEE Symposium on Security and Privacy (1999), 133-145, discloses using variable sub-sequence sizes, masks, and state machines to analyze sequences of system calls into the kernel of an operating system.

David Wagner and Paolo Soto, "Mimicry attacks on host-based intrusion detection systems", Proceedings of the 9th ACM conference on Computer and communications security (CCS '02), ACM, New York, N.Y., USA, 255-264 discloses the notion of a mimicry attack, which allows a sophisticated attacker to cloak their intrusion to avoid detection by an intrusion detection system (IDS). An attacker may craft a malicious sequence that, when decomposed, contains only known n-grams.

This mimicry attack may be difficult to exploit on a real system, as an attacker needs to know n-grams that have been used to model a particular system's behavior and encode a malicious sequence from them. However, for a large system, such databases can be very large and a large selection of n-grams may simplify the task.

Stephanie Forrest, Steven Hofmeyr, and Anil Somayaji, "The Evolution of System-Call Monitoring", Proceedings of the 2008 Annual Computer Security Applications Conference (ACSAC '08), IEEE Computer Society, Washington, D.C., USA, 418-430, discloses that the similarities between computer security and the problem of protecting a body against damage from externally and internally generated threats are compelling and were recognized as early as 1972 when the term "computer virus" was coined. The connection to immunology was made explicit in the mid 1990s, leading to a variety of prototypes, commercial products, attacks, and analyses. The use of system-call monitoring and its application to anomaly intrusion detection and response is discussed.

Operation sequence behavior models can be used to detect appearance of previously unknown sequence of actions. They are attractive for detecting foreign code execution due to attacks, such as buffer overflow or cross-site scripting.

Raman, P., "JaSpin: JavaScript Based Anomaly Detection of Cross-Site Scripting Attacks", Master's thesis, Carleton University, Ottawa, Ontario (2008), discloses that the increasing use of sophisticated JavaScript in web applications has led to the widespread exploitation of cross-site scripting (XSS) flaws. An anomaly detection-based approach for detecting cross-site attacks is disclosed. JaSPIn is based on the observation that the patterns of JavaScript methods invoked by web sites is extremely consistent, even for complex AJAX-driven applications. Thus, web page behavioral profiles can be generated by recording the methods executed when legitimate content is displayed. These profiles can then be used to constrain JavaScript behavior so that XSS attacks cannot succeed.

However, operation behavior sequence models can not be used to detect anomalies that do not manifest themselves by the appearance of an unknown sequence. For example, a typical sequence for a business transaction may contain a segment representing execution of a security mechanism. An attack may represent itself by a sequence in which this segment is missing. Such a sequence may be accepted as it does not introduce anything unknown.

Another limitation of operation sequence behavior models is that they use only a single action attribute, which is often not enough to accurately represent a system's behavior. For example, a system may have a policy which requires that certain actions are executed by different users to ensure separation of duties. Without including other attributes in the model, it is not possible to capture this policy and detect any violations.

More recent research in this area is focused on finding behavioral norms, that is, emergent, repeating patterns of behavior built from system logs. A trace is partitioned into a number of sub-traces (called "strands") identified as executions of some transaction-like process. The resulting behavioral model includes multiple distinct n-gram models for each of the strands. Such an approach allows the building of a much more precise model. However, it may be significantly larger and its size will depend on a number of strands used for a learning process. This means that it is not practical. An initial approach to aggregate n-gram databases was useful in understanding system structure but resulting precision was very low.

O. Pieczul and S. N. Foley, "Discovering emergent norms in security logs", IEEE Conference on Communications and Network Security (CNS-SafeConfig), Washington D.C., 2013, discloses a model that characterizes security logs as a collection of norms that reflect patterns of emergent behavior. An analysis technique for detecting behavioral norms based on these logs is described and evaluated. The application of behavioral norms is considered, including its use in system security evaluation and anomaly detection.

O. Pieczul and S. N. Foley, "Collaborating as normal: detecting systemic anomalies in your partner", 22nd International Workshop on Security Protocols, Cambridge, UK, 2014, discloses whether anomaly detection techniques might be used to determine potentially malicious behavior by service providers. Data mining techniques can be used to derive patterns of repeating behavior from logs of past interactions between service consumers and providers. Consumers may use these patterns to detect anomalous provider behavior, while providers may seek to adapt their behavior in ways that cannot be detected by the consumer. A challenge is deriving a behavioral model that is a sufficiently precise representation of the consumer-provider interactions. Behavioral norms, which model these patterns of behavior, are used to explore these issues in an on-line photograph sharing style service.

BRIEF SUMMARY OF THE INVENTION

Embodiments of the present invention provide a method, computer program product, and a computer system for generating a behavioral model, the computer system having a system log recording events generated by a plurality of processes executing on one or more processors of the computer system. The one or more processors partition the system log into a plurality of strands, each strand including events that share a common characteristic. The one or more processors select attributes from the strands. The one or more processors generate first distinct n-grams, each n-gram including attributes from successive events within a strand. The one or more processors generate a first plurality of n-gram groups, each n-gram group including a plurality of the first distinct n-grams in which a first one of the plurality of first distinct n-grams can coexist in a strand also containing a second one of the plurality of first distinct n-grams. The one or more processors generate a first plurality of n-gram group arrangements, each n-gram group arrangement including a plurality of n-gram groups, each of the n-gram groups being found, in combination, in at least one strand, in which the behavioral model includes the first distinct n-grams, the first plurality of n-gram groups, and the first plurality of n-gram group arrangements, and the one or more processors determine whether an anomaly of events occurs in the computer system, based on the behavior model.

Embodiments of the invention provide the advantage of being more resistant to mimicry attacks. Embodiments of the invention further provide the advantage of detecting new types of anomalies. In addition to detecting wrong, previously unknown event sequences, sequences that are in the learning material but are missing from the sequence to be compared with the behavioral model can be detected. Embodiments of the invention further provide the advantage that very little additional memory is used than would be used for a behavioral model based simply on n-grams.

In an embodiment of the present invention, first distinct n-grams are represented in a hash table mapping each n-gram of the first distinct n-grams into an identifier.

In an embodiment of the present invention, n-gram groups of the first plurality of n-gram groups are represented by an array of integers corresponding to n-gram identifiers, each n-gram group having its own identifier. This has the advantage of representing the n-gram groups in a very memory efficient manner.

In an embodiment of the present invention, first plurality of n-gram groups represent common sequences of first distinct n-grams appearing at the start of a process, or common end sequences of first distinct n-grams appearing at the end of a process. This has the advantages of being able to easily determine normal behavior at the start and end of a process.

In an embodiment of the present invention, first plurality of n-gram group arrangements are represented by arrays of integers, each integer corresponding to an n-gram group of the first plurality of n-gram groups. This has the advantage of representing the n-gram group arrangements in a very memory efficient manner.

In embodiments of the present invention, the step in which the one or more processors determine whether an anomaly of events occurs in the computer system, based on the behavior model, further includes steps in which the one or more processors partition the system log associated with current activity into a plurality of strands. The one or more processors generate second distinct n-grams from the plurality of strands associated with current activity. The one or more processors generate a second plurality of n-gram groups, each n-gram group including a plurality of the second distinct n-grams in which a first one of the plurality of second distinct n-grams can only be found in a strand also containing a second one of the plurality of second distinct n-grams. The one or more processors generate a second plurality of n-gram group arrangements, each n-gram group arrangement including a plurality of n-gram groups, each of the n-gram groups being found, in combination, in at least one strand associated with current activity. The one or more processors determine whether the second distinct n-grams appear in the first distinct n-grams. The one or more processors determine whether the second distinct n-grams appear in the first distinct n-grams, and determining whether the second plurality of n-gram groups appear in the first plurality of n-gram groups, and determining whether the second plurality of n-gram group arrangements appear in the first plurality of n-gram group arrangements. The one or more processors, responsive to the determination, determining whether an anomaly exists between the current activity and the past activity, and responsive to the determination that an anomaly exists, providing an indication to an end user of the computer system of the detection of the anomaly.

Embodiments of the present invention also provide a system for generating a behavioral model of a computer system, the computer system having a system log recording events generated by a plurality of processes executing on the computer system, the system including: program instructions to partition the system log into a plurality of strands, each strand including events that share a common characteristic; program instructions to select attributes from the strands; program instructions to generate first distinct n-grams, each n-gram including attributes from successive events within a strand, each distinct n-gram differing from others of the distinct n-grams; program instructions to generate a first plurality of n-gram groups, each n-gram group including a plurality of the first distinct n-grams in which a first one of the plurality of first distinct n-grams can only be found in a strand also containing a second one of the plurality of first distinct n-grams; program instructions to generate a first plurality of n-gram group arrangements, each n-gram group arrangement including a plurality of n-gram groups, each of the n-gram groups being found, in combination, in at least one strand; and wherein the behavioral model includes the first distinct n-grams, the first plurality of n-gram groups and the first plurality of n-gram group arrangements.

In embodiments of the present invention, the step in which the computer system determines whether an anomaly of events occurs in the computer system, based on the behavior model, further includes steps in which the computer system executes program instructions to partition the system log associated with current activity into a plurality of strands. The program instructions generate second distinct n-grams from the plurality of strands associated with current activity. The program instructions generate a second plurality of n-gram groups, each n-gram group including a plurality of the second distinct n-grams in which a first one of the plurality of second distinct n-grams can only be found in a strand also containing a second one of the plurality of second distinct n-grams. The program instructions generate a second plurality of n-gram group arrangements, each n-gram group arrangement including a plurality of n-gram groups, each of the n-gram groups being found, in combination, in at least one strand associated with current activity. The program instructions determine whether the second distinct n-grams appear in the first distinct n-grams. The program instructions determine whether the second distinct n-grams appear in the first distinct n-grams, and determine whether the second plurality of n-gram groups appear in the first plurality of n-gram groups, and determine whether the second plurality of n-gram group arrangements appear in the first plurality of n-gram group arrangements. The program instructions, responsive to the determination, determine whether an anomaly exists between the current activity and the past activity, and responsive to the determination that an anomaly exists, provide an indication to an end user of the computer system of the detection of the anomaly.

Embodiments of the present invention also provide a computer program product for generating a behavioral model, the computer system having a system log recording events generated by a plurality of processes executing on the computer system, the computer program product including a computer-readable, non-transitory storage medium having computer readable program code embodied therewith, the computer readable program code adapted to perform the method described above when the program is run on a computer.

Embodiments of the present invention also provide a computer program product for detecting anomalies between current activity and past activity in a computer system, the computer system having a system log recording events generated by a plurality of processes executing on the computer system, the computer program product including: a computer-readable, non-transitory storage medium having computer readable program code embodied therewith, the computer readable program code adapted to perform the method described above when the program is run on a computer.

BRIEF DESCRIPTION OF THE DRAWINGS

Preferred embodiments of the present invention will now be described in more detail, by way of example, with reference to the accompanying drawings, in which:

FIG. 4 shows an example of n-grams generated from the strands of FIG. 2, in accordance with an embodiment of the present invention.

DETAILED DESCRIPTION

Embodiments of the present invention generate a behavioral model that uses two types of correlation between computer system events, short range correlations (n-grams) and long range correlations (groups and group arrangements) between n-grams. Processes running on the computer system perform events, which are recorded in the system log. The events are collectively referred to, herein, as activity or behavior of the computer system. The behavioral model is based on the assumption that system traces contain a number of finite sub-traces (strands) that describe complete transaction-like system activity. O. Pieczul and S. N. Foley, "Discovering emergent norms in security logs", mentioned above and hereby incorporated by reference, describes the concept of system traces containing a number of strands and provides examples and a general approach for extracting such sub-traces.

Figure 1:
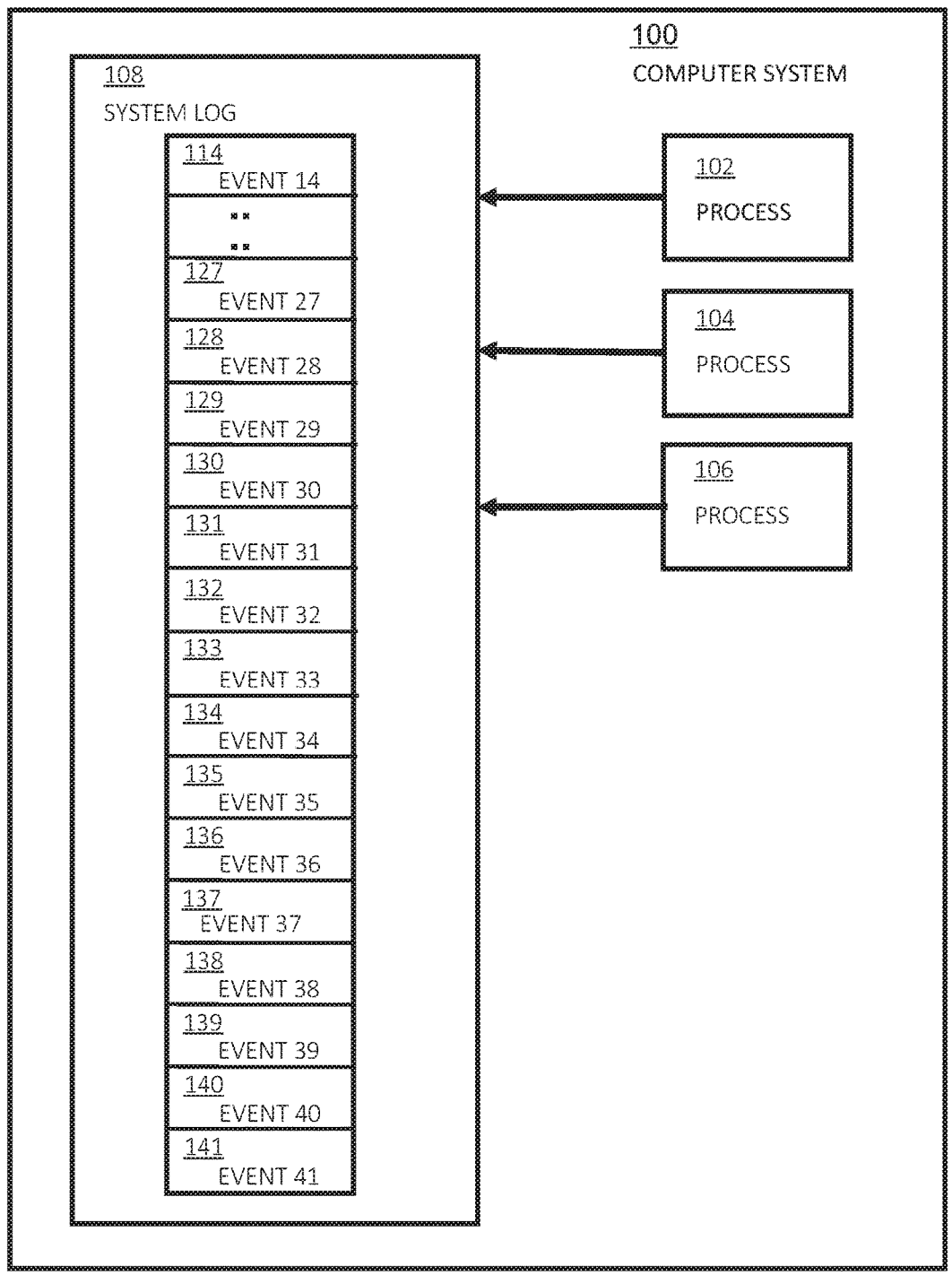
FIG. 1 shows a computer system having a plurality of processes which generate events which are stored in a system log, in accordance with an embodiment of the present invention.

FIG. 1 shows a computer system 100 having a plurality of processes 102, 104, and 106, which generate events 114-141, which are stored in a conventional system log 108. System log 108 data is a useful source of information for monitoring security violations and identifying incidents. System log 108 records a sequence of system and/or application events 114-141 in chronological order. Processes 102, 104, and 106 may each be one or a combination of system processes or application processes. Any number of processes may be present in computer system 100, and typically there may be many more than the three shown. Similarly, there will typically be a much larger number of events 114-141, but only a small number of events are shown for clarity.

Figure 2:
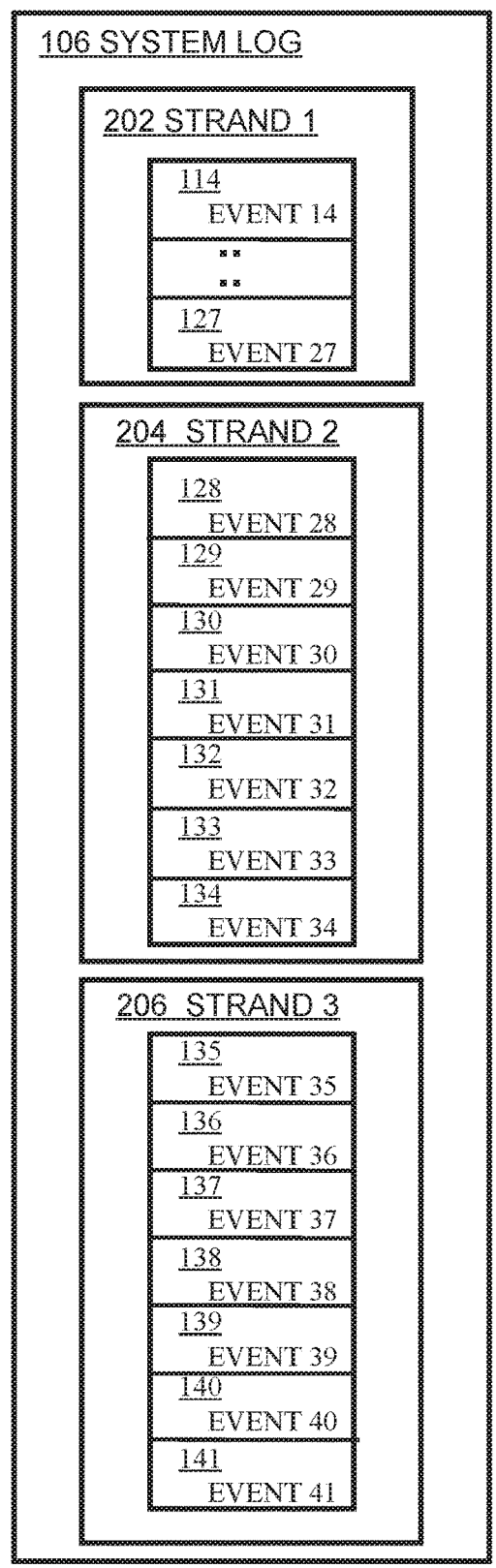
FIG. 2 shows an exemplary system log of FIG. 1, separated into three strands, each having multiple events, in accordance with an embodiment of the present invention.

FIG. 2 shows an exemplary system log of FIG. 1, separated into three strands, each having multiple events, in accordance with an embodiment of the present invention. A trace is shown, which includes a sequence of events 114-141. A strand, such as one of strands 202, 204, and 206, is a trace of events 114-141 that share a common characteristic.

Any trace can be partitioned into a set of strands, such as strands 202, 204, 206, which preserves the ordering of events 114-141 from the original trace. Again, there will typically be many more than the three strands 202, 204, 206 shown. The common characteristic may be one of the attributes of events 114-141. An example event is:

1407348140914 user22 exec /bin/foo

In the example event, 1407348140914 may be a timestamp or a sequence number, user22 is the user name that generated the event, exec is the command that was executed and /bin/foo is the operand on which the command was executed. Each of these portions of events 114-141, recorded in the system log 108, is an attribute of the event. Events 114-141 may have these or other attributes in any combination, the attributes in the example event being purely exemplary of the types of attribute that might be found in the example event.

Embodiments of the present invention will be described below based on an exemplary extract from an example system log 108. The extract from the example system log 108 includes events 114-141 generated by three different transaction-like processes 102, 104, 106. Embodiments of the invention infer the behavioral model from the system log 108. Each of strands 202, 204, and 206 represent execution of one of processes 102, 104, and 106. Each strand 202, 204, and 206 includes a Unix-like system trace of system calls and covers scenarios such as copying data from one file to another. In the complete system log 108 of which the extract forms part, there were 200 strands. Strands 202, 204, and 206, have been chosen for this description for the purposes of clarity. The trace extracts associated with the three strands, strands 202, 204, and 206 from the system log 108, are shown below.

Strand 1:
1407348140914 user22 exec /bin/foo
1407348140915 user22 fstat /tmp/temp603
1407348140916 user22 unlink /tmp/tmp603
1407348140917 user22 fstat /etc/passwd
1407348140918 user22 open /etc/passwd
1407348140919 user22 open temp168
1407348140920 user22 read /etc/passwd
1407348140921 user22 write temp168
1407348140922 user22 read /etc/passwd
1407348140923 user22 write temp168
1407348140924 user22 close /etc/passwd
1407348140925 user22 close temp168
1407348140926 user22 other some491
1407348140927 user22 another some989
Strand 2:
1407348140928 user13 mmap 7168
1407348140929 user13 fstat /etc/passwd
1407348140930 user13 open /etc/passwd
1407348140931 user13 read /etc/passwd
1407348140932 user13 close /etc/passwd
1407348140933 user13 fstat /etc/passwd
1407348140934 user13 exit 0
Strand 3:
1407348140935 user35 exec /bin/foo
1407348140936 user35 mmap 4096
1407348140937 user35 fstat /tmp
1407348140938 user35 opendir /tmp
1407348140939 user35 read /tmp
1407348140940 user35 fstat temp 3615
1407348140941 user35 exec temp3615

Aspects, such as log pre-processing, identifying criteria to partition traces, and identifying event attributes that correspond with computer system activity are further described in O. Pieczul and S. N. Foley, "Discovering emergent norms in security logs" mentioned above.

Figure 3:
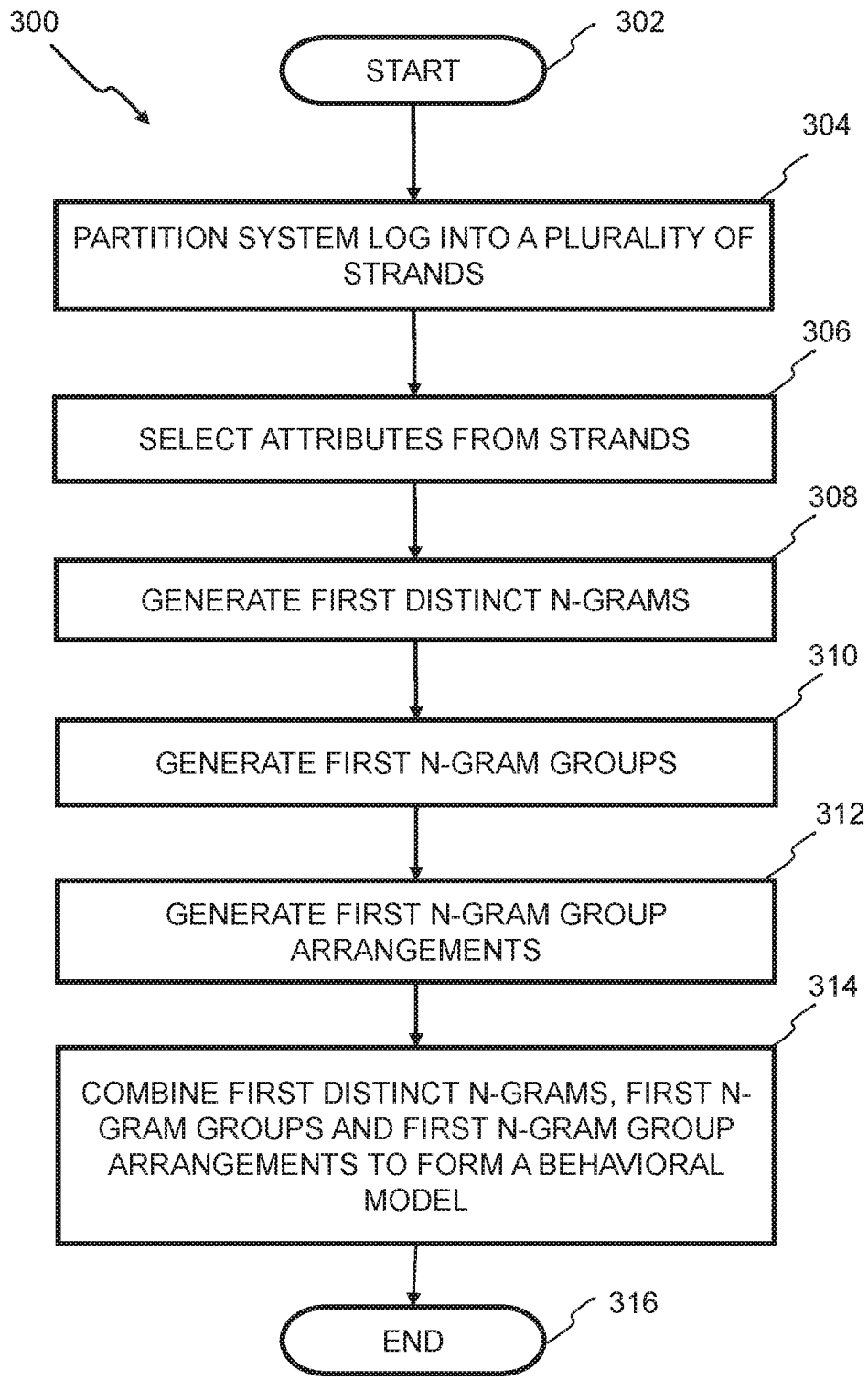
FIG. 3 is a flowchart of operations of a behavioral model generation method, in accordance with an embodiment of the present invention.

FIG. 3 shows a flowchart of behavioral model program 300, a method of detecting an anomaly based on a generated behavioral model, in accordance with an embodiment of the present invention. The method starts at step 302. At step 304, system log 108 is partitioned into a plurality of strands 202, 204, and 206 by behavioral model program 300. Behavioral model program 300 is a program that partitions system log 108, selects attributes from the strands formed by partitioning, generates distinct n-grams, n-gram groups, and n-gram group arrangements, and combines the n-grams, groups, and arrangements to form a behavioral model. Each strand of strands 202, 204, and 206 includes events from events 114-141. As mentioned above, the choice of three strands is purely exemplary, and system log 108 may be partitioned into any number of strands, provided that the events in each strand, such as strands 202, 204, and 206, share a common characteristic. In the example extracts above, the common characteristic is the user name that generated one or more events of events 114-141. That is, strand 1 202 (FIG. 2) includes events 114-127 generated by user name user22, strand 2 204 includes events 128-134 generated by user name user13, and strand 3 206 includes events 135-141 generated by user name user35. In other embodiments, other characteristics common between the events may be used, such as the process ID. At step 306, behavioral model program 300 selects attributes from strands 202, 204, and 206 for processing. Only some attributes of events 114-141 recorded in the system log 108 are selected for processing to produce the behavioral model. O. Pieczul and S. N. Foley, "Discovering emergent norms in security logs", mentioned above, describes, in particular in section 3, how the attributes are selected. In an exemplary embodiment, the attribute is selected by taking the command that was executed and recorded in an event of events 114-141 in system log 108. In some cases, the operand is also included in the attribute following the command. The attributes for each of the strands which were selected in the exemplary embodiment are shown below.

| Strand 1: | Strand 2: | Strand 3: |
| --- | --- | --- |
| exec /bin/foo | mmap * | exec /bin/foo |
| fstat * | fstat /etc/passwd | mmap * |
| unlink * | open /etc/passwd | fstat /tmp |
| fstat /etc/passwd | read /etc/passwd | opendir /tmp |
| open /etc/passwd | close /etc/passwd | read /tmp |
| open * | fstat /etc/passwd | fstat * |
| read /etc/passwd | exit 0 | exec * |
| write * | | |
| read /etc/passwd | | |
| write * | | |
| close /etc/passwd | | |
| close * | | |
| other * | | |
| another * | | |

Note that although /bin/foo, /etc/password and /tmp as operands have been retained, all other operands have been replaced by wildcards. Such replacement is based on the retained operands being the most frequent operands. In other embodiments, no operands are retained. In yet further embodiments, the operands retained is based on parameters other than being the most frequent operands.

The use of attributes selected from the events within strands 202, 204, and 206, results in each of strands 202, 204, and 206 represented as a sequence of operations. The sequence of operations for each of strand 1 202, strand 2 204 and strand 3 206 is shown below:

Strand 1: exec /bin/foo, fstat *, unlink *, fstat /etc/passwd, open /etc/passwd, open *, read /etc/passwd, write *, read /etc/passwd, write *, close /etc/passwd, close *, other *, another *

Strand 2: mmap *, fstat /etc/passwd, open /etc/passwd, read /etc/passwd, close /etc/passwd, fstat /etc/passwd, exit 0

Strand 3: exec /bin/foo, mmap *, fstat /tmp, opendir /tmp, read /tmp, fstat *, exec *

The sequences of operations above represent the sequences obtained from strands 202, 204, and 206. In a typical system, there may many more strands, for example, two hundred strands, representing two hundred sequences of operation. The sequences of operations of the strands provide an approximate model of normal system operation, but in practice, the sequences of operations are not very useful in this format. In practice, most of the differences between strands 202, 204, and 206 are related to small perturbations, such as execution in loops, conditional statements, and the like.

At step 308, behavioral model program 300 generates first distinct n-grams based on strands 202, 204, and 206, which resulted from the partitioning of system log 108 of step 304. Referring to FIG. 4, n-grams 413-422, generated from strand 2 204 and strand 3 206, are shown. For brevity purposes, n-grams 401-412, which are generated from strand 1 202, and n-grams 423-432, which are generated from strands other than strands 202, 204, and 206, are not depicted in FIG. 4; however, n-grams 423-432 are included in the generation of n-gram groups from strands other than strands 202, 204, and 206, discussed in reference to FIG. 7. Each of n-grams 413-422 is a tri-gram, which is a consecutive sequence of three items from the attributes selected from events 114-141. In other embodiments, other n-grams can be used. In yet further embodiments, both tri-grams and 7-grams could be used in parallel. Groups and group arrangements can be created from the tri-grams and 7-grams in the same way as described here for tri-grams. Tri-grams and 7-grams are selected as purely exemplary examples of n-grams and other n-grams or combinations of n-grams may be used. O. Pieczul and S. N. Foley, "Discovering emergent norms in security logs", mentioned above, describes how the best value for n may be found for a particular system, particularly in section IV. N-gram 13 413 to n-gram 17 417 are generated from strand 2 204, and n-gram 18 418 to n-gram 22 422 are generated from strand 3 206. Although not shown in FIG. 4, n-gram 01 to n-gram 12 are generated from strand 1 202. N-gram 13 413 consists of three consecutive attributes, shown in FIG. 4 as Attr 31, Attr 32 and Attr 33. In the particular embodiment described, the attributes for n-gram 13 413 are derived by taking three consecutive events, for example events 131-133, and processing them by selecting the attributes from them. In the exemplary embodiment, for n-gram 13 413, the events are:

1407348140931 user13 read /etc/passwd
    1407348140932 user13 close /etc/passwd
    1407348140933 user13 fstat /etc/passwd and the corresponding attributes are read /etc/passwd, close etc/passwd and fstat /etc/passwd. This results in a tri-gram 413 of [read /etc/passwd, close etc/passwd, fstat /etc/passwd]. Similarly, in the exemplary embodiment, for n-gram 15 415, the events are:

1407348140928 user13 mmap 7168
    1407348140929 user13 fstat /etc/passwd
    1407348140930 user13 open /etc/passwd and the corresponding attributes are mmap *, fstat etc/passwd and open /etc/passwd. This results in a tri-gram 413 of [mmap *, fstat etc/passwd, open /etc/passwd].

A list of n-grams generated from each of strand 1 202, strand 2 204 and strand 3 206 are shown below:

01 [close /etc/passwd, close *, other*]
02 [write *, close /etc/passwd, close *]
03 [write * read /etc/passwd, write *]
04 [open *, read /etc/passwd, write *]
05 [open /etc/passwd, open *, read /etc/passwd]
06 [unlink *, fstat /etc/passwd, open /etc/passwd]
07 [exec /bin/foo, fstat *, unlink *]
08 [fstat /etc/passwd, open /etc/passwd, open *]
09 [read /etc/passwd, write *, close /etc/passwd]
10 [read /etc/passwd, write *, read /etc/passwd]
11 [close *, other *, another *]
12 [fstat *, unlink *, fstat /etc/passwd]
13 [read /etc/passwd, close /etc/passwd, fstat /etc/passwd]
14 [fstat /etc/passwd, open /etc/passwd, read /etc/passwd]
15 [mmap *, fstat /etc/passwd, open /etc/passwd]
16 [open /etc/passwd, read /etc/passwd, close /etc/passwd]
17 [close /etc/passwd, fstat /etc/passwd, exit 0]
18 [fstat /tmp, opendir /tmp, read /tmp]
19 [read /tmp, fstat *, exec *]
20 [mmap *, fstat /tmp, opendir /tmp]
21 [exec /bin/foo, mmap 0, fstat /tmp]
22 [opendir /tmp, read /tmp, fstat *]

N-gram 13 413 to n-gram 22 422 in the list above are depicted in FIG. 4, and n-gram 01 to n-gram 12 are those generated from strand 1 202. In the list above, the n-grams are generated from the following events in each strand:

Strand 1:
01 Events 24, 25 and 26
02 Events 23, 24 and 25
03 Events 21, 22 and 23
04 Events 19, 20 and 21
05 Events 18, 19 and 20
06 Events 16, 17 and 18
07 Events 14, 15 and 16
08 Events 17, 18 and 19
09 Events 22, 23 and 24
10 Events 20, 21 and 22
11 Events 25, 26 and 27
12 Events 15, 16 and 17
Strand 2:
13 Events 31, 32 and 33
14 Events 29, 30 and 31
15 Events 28, 29 and 30
16 Events 30, 31 and 32
17 Events 32, 33 and 34
Strand 3:
18 Events 37, 38 and 39
19 Events 39, 40 and 41
20 Events 36, 37 and 38
21 Events 35, 36 and 37
22 Events 38, 39 and 40

The n-grams produced from system log 108 of past behavior of computer system 100 provide a set of acceptable n-grams. The traditional n-gram model is combined with the novel aspects of n-gram groups and group arrangements, in embodiments of the present invention. In a typical system, there may be two hundred strands, thus producing two hundred sets of n-grams, one set for each strand. The two hundred sets of n-grams also provide an approximate model of normal system operation. They are a little more useful than the two hundred sequences of operations, allowing more flexibility. The number of sets of n-grams may be lower than two hundred, as some sequences may have the same n-gram representation. For example, a sequence of operation of open/filet, read/filet, close/file1 results in the same tri-gram representation as open/file2, read/file2, close/file2, that is [open *, read *, close *].

The prior art model of n-grams generated from strands has the problem that it requires a large amount of memory. A prior art approach is to union all the sets of n-grams into a single set of n-grams. Such a behavioral model becomes a limited model of short-range correlations between events in the system log 108 of the computer system 100. However, aggregating all of the sets of n-grams into a single set of n-grams also results in the model being less precise. When a new sequence of operations is matched to the behavioral model, all that can be verified is whether or not it contains any n-gram that has not been seen before. If the new sequence of operations does not contain an n-gram that has not been seen before, then it may be interpreted as typical of normal system behavior. If it does contain one or more n-grams that have not been seen before, then it may be interpreted as typical of abnormal or anomalous system behavior. What is not possible to check by prior methods is whether the new sequence of operations contains the combination of the n-grams which are expected to appear in the sequence of operations. It is also not possible to check whether the sequence of operations contains events that should never appear together. For example, if the aggregated n-gram set contains the tri-gram [open *, open *, read *] from strand X and [open *, read *, close *] from strand Y, then the sequence [open *, open *, read *, close *] will be considered a valid sequence, even though such a sequence never existed in any strand. Embodiments of the present invention aim to reduce the memory size of the behavioral model without reducing its precision.

Returning to FIG. 3, at step 310, behavioral model program 300 generates n-gram groups, from n-grams 401-422. N-grams 413-422 are depicted in FIG. 4, and shown in n-gram groups in FIG. 5. N-gram 01 401 to n-gram 22 422 are analyzed based on their occurrence in each of strand 1 202, strand 2 204 and strand 3 206. Some n-grams will always appear, or coexist, with another n-gram, in a strand, such as strands 202, 204, and 206. For example, if one strand of strands 202, 204, and 206 contains n-gram 08 408 [fstat /etc/passwd, open /etc/passwd, open *], then it also contains n-gram 09 409 [read /etc/passwd, write *, close /etc/passwd]. Likewise, if one strand of strands 202, 204, and 206 contains n-gram 09 409, then it also contains n-gram 08 408. The analysis of n-gram combination occurrence is summarized in the table below, in which "A" at a position means that an n-gram of n-grams 401-422 at the top of the column always appears together with the n-gram of n-grams 401-422 at the left of the row. Similarly, "N" at a position means that the n-gram at the top of the column never appears together with the n-gram at the left of the row. A blank at a position indicates that the n-gram of n-grams 401-422 at the top of the column does appear sometimes with the n-gram of n-grams 401-422 at the left of the column, but not always. For example, n-gram 13 413 [read /etc/passwd, close /etc/passwd, fstat /etc/passwd] always appears with n-gram 14 414 [fstat /etc/passwd, open /etc/passwd, read /etc/passwd], never appears with n-gram 18 418 [fstat /tmp, opendir /tmp, read /tmp] and sometimes appears with n-gram 15 415 [mmap *, fstat /etc/passwd, open /etc/passwd].

|    | 01 | 02 | 03 | 04 | 05 | 06 | 07 | 08 | 09 | 10 | 11 | 12 | 13 | 14 | 15 | 16 | 17 | 18 | 19 | 20 | 21 | 22 |
|----|----|----|----|----|----|----|----|----|----|----|----|----|----|----|----|----|----|----|----|----|----|----|
| 01 | A  | A  |    | A  | A  |    |    | A  | A  |    | A  |    | N  | N  | N  | N  | N  | N  | N  | N  | N  | N  |
| 02 | A  | A  |    | A  | A  |    |    | A  | A  |    | A  |    | N  | N  | N  | N  | N  | N  | N  | N  | N  | N  |
| 03 | A  | A  | A  | A  | A  |    |    | A  | A  | A  | A  |    | N  | N  | N  | N  | N  | N  | N  | N  | N  | N  |
| 04 | A  | A  |    | A  | A  |    |    | A  | A  |    | A  |    | N  | N  | N  | N  | N  | N  | N  | N  | N  | N  |
| 05 | A  | A  |    | A  | A  |    |    | A  | A  |    | A  |    | N  | N  | N  | N  | N  | N  | N  | N  | N  | N  |
| 06 | A  | A  |    | A  | A  | A  | A  | A  | A  |    | A  | A  | N  | N  | N  | N  | N  | N  | N  | N  | N  | N  |
| 07 | A  | A  |    | A  | A  | A  | A  | A  | A  |    | A  | A  | N  | N  | N  | N  | N  | N  | N  | N  | N  | N  |
| 08 | A  | A  |    | A  | A  |    |    | A  | A  |    | A  |    | N  | N  | N  | N  | N  | N  | N  | N  | N  | N  |
| 09 | A  | A  |    | A  | A  |    |    | A  | A  |    | A  |    | N  | N  | N  | N  | N  | N  | N  | N  | N  | N  |
| 10 | A  | A  | A  | A  | A  |    |    | A  | A  | A  | A  |    | N  | N  | N  | N  | N  | N  | N  | N  | N  | N  |
| 11 | A  | A  |    | A  | A  |    |    | A  | A  |    | A  |    | N  | N  | N  | N  | N  | N  | N  | N  | N  | N  |
| 12 | A  | A  |    | A  | A  | A  | A  | A  | A  |    | A  | A  | N  | N  | N  | N  | N  | N  | N  | N  | N  | N  |
| 13 | N  | N  | N  | N  | N  | N  | N  | N  | N  | N  | N  | N  | A  | A  |    |    | A  | N  | N  | N  | N  | N  |
| 14 | N  | N  | N  | N  | N  | N  | N  | N  | N  | N  | N  | N  | A  | A  |    |    | A  | N  | N  | N  | N  | N  |
| 15 | N  | N  | N  | N  | N  | N  | N  | N  | N  | N  | N  | N  | A  | A  | A  |    | A  | N  | N  | N  | N  | N  |
| 16 | N  | N  | N  | N  | N  | N  | N  | N  | N  | N  | N  | N  | A  | A  |    | A  | A  | N  | N  | N  | N  | N  |
| 17 | N  | N  | N  | N  | N  | N  | N  | N  | N  | N  | N  | N  | A  | A  |    |    | A  | N  | N  | N  | N  | N  |
| 18 | N  | N  | N  | N  | N  | N  | N  | N  | N  | N  | N  | N  | N  | N  | N  | N  | N  | A  | A  |    |    | A  |
| 19 | N  | N  | N  | N  | N  | N  | N  | N  | N  | N  | N  | N  | N  | N  | N  | N  | N  | A  | A  |    |    | A  |
| 20 | N  | N  | N  | N  | N  | N  | N  | N  | N  | N  | N  | N  | N  | N  | N  | N  | N  | A  | A  | A  | A  | A  |
| 21 | N  | N  | N  | N  | N  | N  | N  | N  | N  | N  | N  | N  | N  | N  | N  | N  | N  | A  | A  | A  | A  | A  |
| 22 | N  | N  | N  | N  | N  | N  | N  | N  | N  | N  | N  | N  | N  | N  | N  | N  | N  | A  | A  |    |    | A  |

N-gram groups (504-514 in FIG. 5) are generated by behavioral model program 300, by grouping the n-grams 401-422 that always appear together in strands 202, 204, and 206. In an n-gram group, such as the n-gram groups shown in FIG. 5, n-grams 401-422 do not necessarily appear consecutively or even close to each other, they merely appear in the same strand of strands 202, 204, and 206. As an example, a strand of strands 202, 204, and 206 may include a common beginning and a common end of a transaction, such as opening a file for reading and/or writing at the beginning of a strand and closing the file at the end of the strand. In a similar manner, n-gram groups are formed from n-grams 423-432, which occur in strands other than strands 202, 204, and 206.

From the table above, it can be seen that in strand 1 202, n-grams 01, 02, 04, 05, 08, 09, and 11 always appear together, as do n-grams 03 and 10, and n-grams 06, 07, and 12. These combinations of n-grams can be said to coexist within a particular strand. In strand 2 204, n-grams 13, 14, and 17 always appear together. In strand 3 206, n-grams 18, 19, and 22 always appear together as do n-grams 20 and 21.

Each of n-grams 401-422 will appear in at least one group of groups 504-514 because an n-gram 401-422 will always appear with itself.

Figure 5:
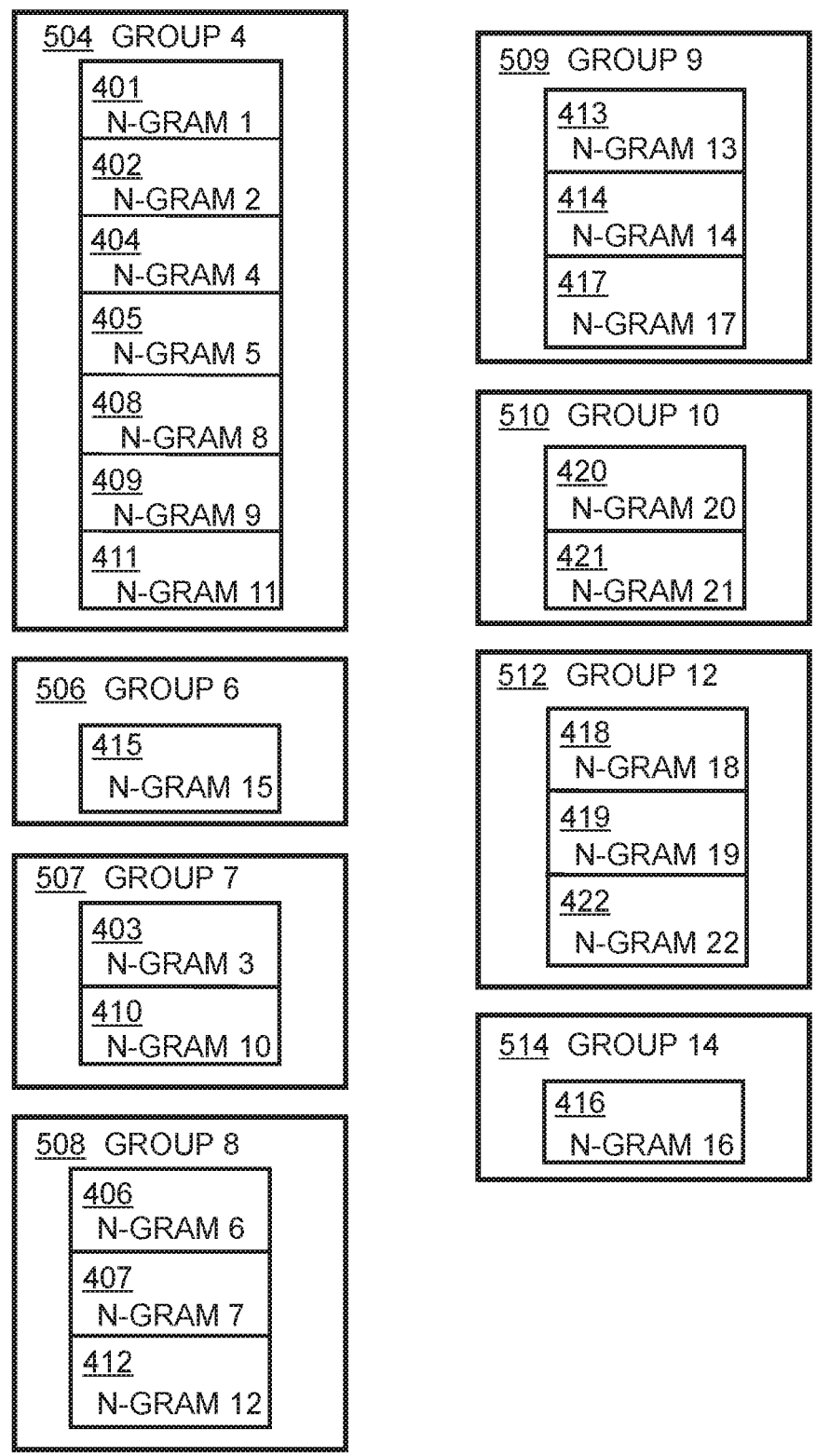
FIG. 5 shows an example of n-gram groups generated from the n-grams of FIG. 4, in accordance with an embodiment of the present invention.

FIG. 5 shows the n-gram groups 504, 506-510, 512, and 514, generated by taking n-grams from n-grams 401-422 that always appear together in strands 202, 204, 206, and grouping them. Groups 1 to 3 501-503, group 5 505, group 11 511 and group 13 are not shown in FIG. 5, but are generated from strands other than strand 1 202, strand 2, 204 and strand 3, 206.

Having determined the occurrence of n-grams in strand 1 202, strand 2 204, and strand 3 206, behavioral model program 300 generates the following n-gram groups:

```
From Strand 1:
    G4 {
        [close /etc/passwd, close *, other *]
        [write *, close /etc/passwd, close *]
        [open *, read /etc/passwd, write *]
        [open /etc/passwd, open *, read /etc/passwd]
        [fstat /etc/passwd, open /etc/passwd, open *]
        [read /etc/passwd, write *, close /etc/passwd]
        [close *, other *, another *]
    }
    G7 {
        [write *, read /etc/passwd, write *]
        [read /etc/passwd, write *, read /etc/passwd]
    }
    G8 {
        [unlink *, fstat /etc/passwd. open /etc/passwd]
        [exec /bin/foo, fstat *, unlink *]
        [fstat *, unlink *, fstat /etc/passwd]
    }
From Strand 2:
    G9 {
        [read /etc/passwd, close /etc/passwd, fstat
            /etc/passwd]
        [fstat /etc/passwd, open /etc/passwd, read /etc/passwd]
        [close /etc/passwd, fstat /etc/passwd, exit 0]
    }
    G6 {
        [mmap *, fstat /etc/passwd, open /etc/passwd]
    }
    G14 {
        [open /etc/passwd, read /etc/passwd, close /etc/passwd]
    }
From Strand 3:
    G12 {
        [fstat /tmp, opendir /tmp, read /tmp]
        [read /tmp, fstat *, exec *]
        [opendir /tmp, read /tmp, fstat *]
    }
    G10 {
        [mmap *, fstat /tmp, opendir /tmp]
        [exec /bin/foo, mmap *, fstat /tmp]
    }
```

The n-gram groups are generated based on a set of relations between n-grams 401-422 with respect to their coexistence in strands 202, 204, 206, and other strands (n-grams 423-432). Various system transactions, processes and components often generate traces that are very similar to each other, but different from sub-traces generated by other transactions. This causes some of n-grams 401-432 to always appear in groups 501-514. Recording the n-gram membership of groups 501-514 captures long-range correlations between events in system log 108. Groups 501-514 are disjoint, so effectively the set of groups 501-514 is a partitioning of all n-grams 401-432. It is possible that some groups, such as G6 and G14 listed above, contain just one n-gram of n-grams 401-432.

Figure 6:
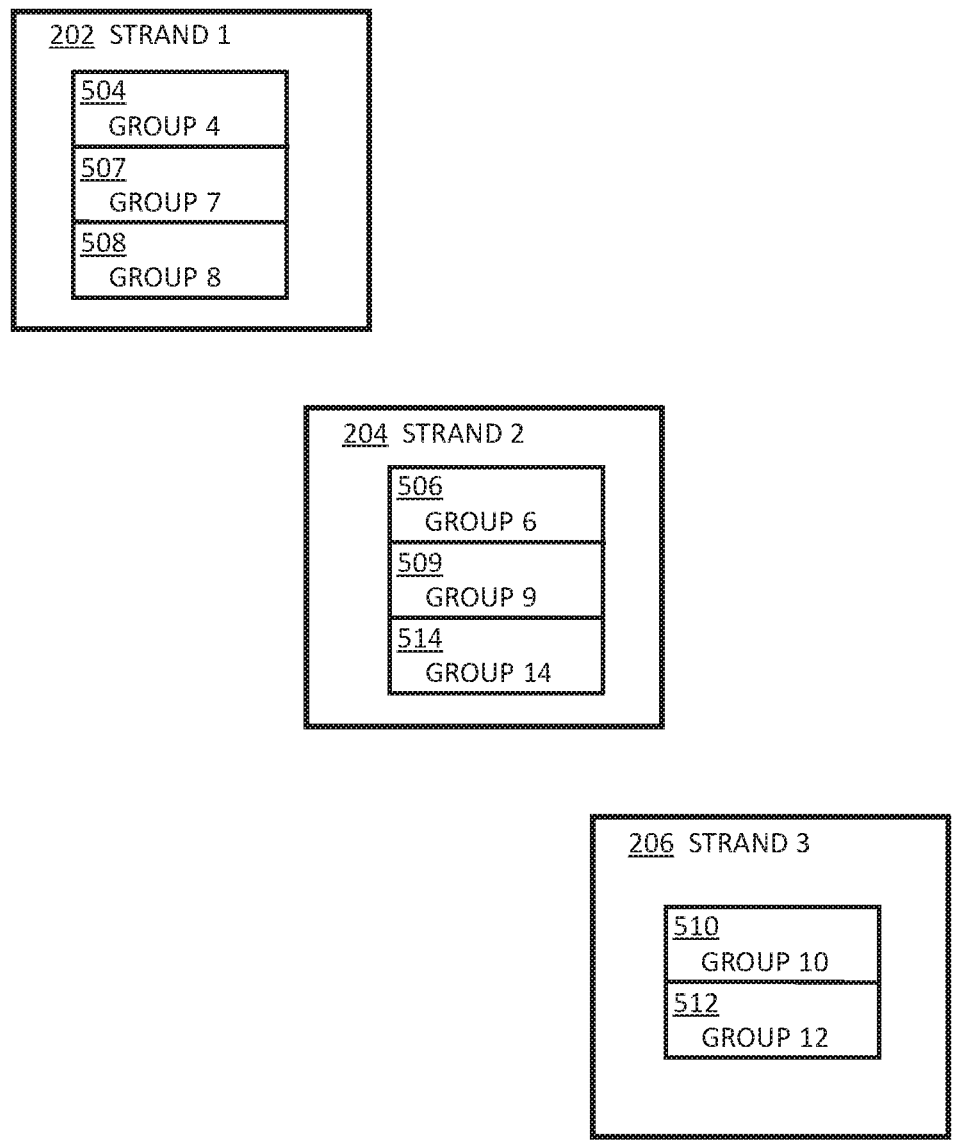
FIG. 6 shows the strands of FIG. 2 represented by the n-gram groups of FIG. 5, in accordance with an embodiment of the present invention.

FIG. 6 shows that strand 1 202, strand 2 204 and strand 3 206 may be represented as a combination of groups, from groups 504, 506-510, 512, 514, present in strands 202, 204, and 206, rather than as lists of n-grams from n-grams 401-422. In the example above, strands 202, 204, and 206 may be represented as:

Strand 1: [G4, G7, G8]
Strand 2: [G6, G9, G14]
Strand 3: [G12, G10]

The combined use of groups 501-514, together with n-grams 401-432 as components of the behavioral model improves precision with very little memory overhead. The improved precision comes from capturing correlations between n-grams 401-432 as groups 501-514. If a particular n-gram appears in a strand to be matched, then it can be expected that other n-grams of n-grams 401-432, occurring in the same strand as the particular n-gram, can be found in an n-gram group of groups 501-514. However, it is still not possible to determine whether the strand to be matched includes n-grams 401-432 from different strands of strands 202, 204, and 206. Each strand of strands 202, 204, and 206 can be represented as a combination of groups, or a group arrangement, from groups 501-514. Each group arrangement (701-713 in FIG. 7) represents a valid arrangement of n-grams 401-432 that has been determined to have been included previously in a strand of strands 202, 204, and 206.

Returning to FIG. 3, at step 312, behavioral model program 300 generates first n-gram group arrangements (shown as 701-713 in FIG. 7) from the n-gram groups 501-514. From the example above, there are three group arrangements, one from each strand 202, 204, 206. These group arrangements for strands 1 202, 2 204, and 3 206 are:

A06: [G4, G7, G8]
A12: [G6, G9, G14]
A10: [G10, G12]

Figure 7:
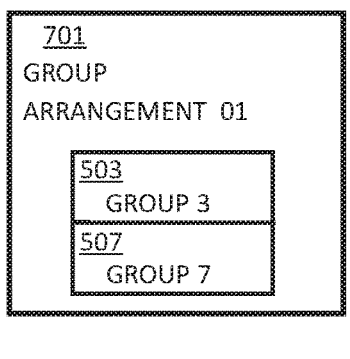
FIG. 7 shows group arrangements generated from the n-grams groups of FIG. 5, in accordance with an embodiment of the present invention.
Figure 7:
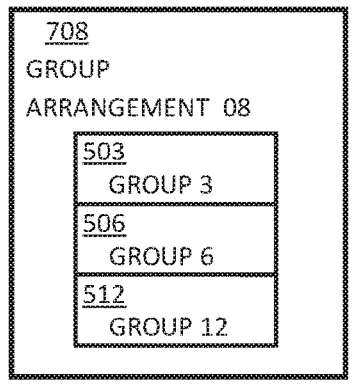
Figure 7:
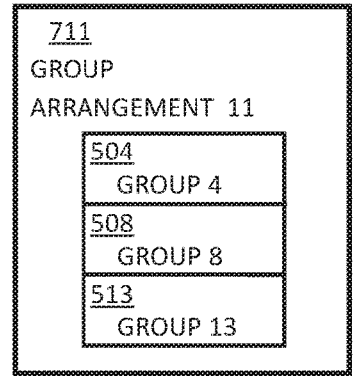
Figure 7:
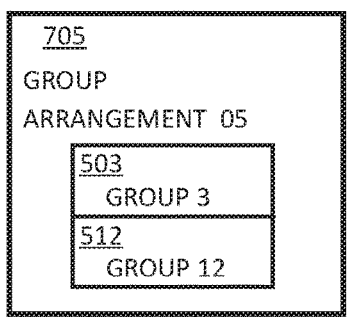
Figure 7:
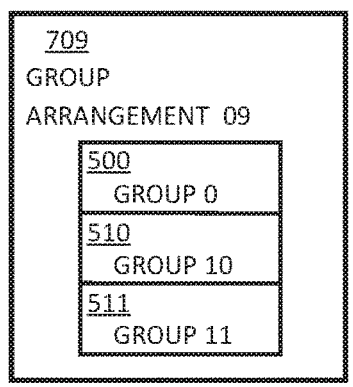
Figure 7:
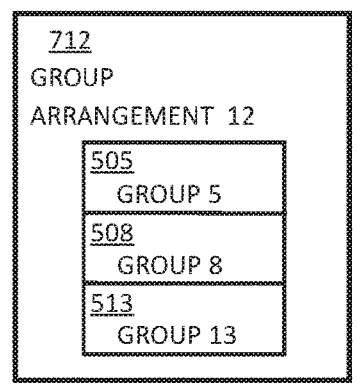
Figure 7:
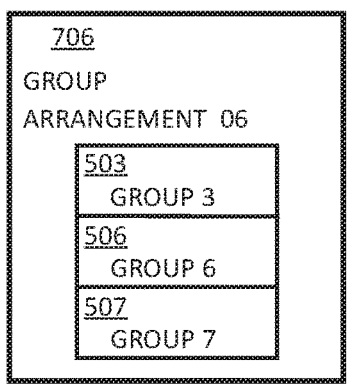
Figure 7:
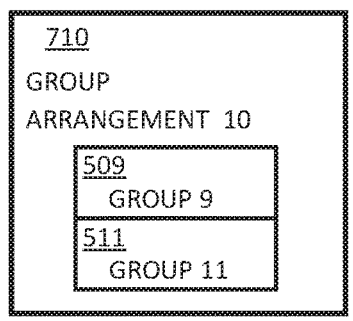
Figure 7:
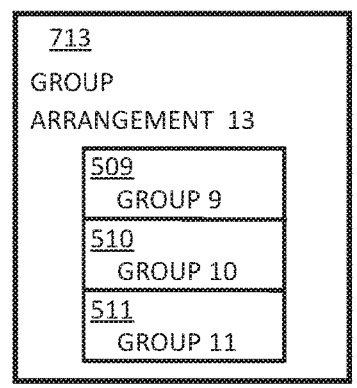

N-gram group arrangements 701-713 in FIG. 7 are a set of possible arrangements between n-gram groups 501-514. Each recorded sub-trace of strands 202, 204, and 206 corresponds to a particular arrangement of n-gram groups 501-514 (a reasonable learning process will require analyzing a very large number of sub-traces). There are a limited number of possible group arrangements 701-713 and each of group arrangements 701-713 models a behavioral pattern representing normal execution of a transaction.

As mentioned above, any number of processes 102, 104, and 106 may be present in the computer system 100, and there typically may be many more than the three shown. Also, there will typically be many more than the three strands, strands 202, 204, and 206, shown. In an exemplary embodiment, there are two hundred strands. The additional one hundred and ninety seven strands result in ten more n-grams 423-432 being generated. The addition of a large number of strands does not increase the number of n-grams in proportion because many n-grams correspond to commonly used combinations of operations, such as opening a file, writing to it and closing it.

The additional n-grams generated from the other strands are shown below:

23 [exec /bin/foo, fstat *, fstat /etc/passwd]
24 [fstat *, fstat /etc/passwd, open /etc/passwd]
25 [read /etc/passwd, read /etc/passwd, close /etc/passwd]
26 [open /etc/passwd, read /etc/passwd, close /etc/passwd]
27 [read /tmp, fstat *, read /tmp]
28 [fstat *, read /tmp, fstat *]
29 [read /etc/passwd, read /etc/passwd, read /etc/passwd]
30 [mmap 0, fstat /tmp, opendir /tmp]
31 [exec /bin/foo, mmap 0, fstat /tmp]
32[mmap 0, fstat /etc/passwd, open /etc/passwd]

In the exemplary embodiment, the table for n-gram 01 401 thru n-gram 22 422 shown above is expanded to cover n-gram 01 401 thru n-gram 32. As in the table above, at each position there is an "A", an "N" or a blank. The additional n-grams result in the following additional n-gram groups being generated:

```
G1, G2, G3, G5, G11, G13
G1 {
    [mmap 0, fstat /tmp, opendir /tmp]
    [exec /bin/foo, mmap 0, fstat /tmp]
}
G2 {
    [read /etc/passwd, read /etc/passwd, read /etc/passwd]
}
G3 {
    [read /etc/passwd, read /etc/passwd, close /etc/passwd]
    [open /etc/passwd, read /etc/passwd, read /etc/passwd]
}
G5 {
    [mmap 0, fstat /etc/passwd, open /etc/passwd]
}
G11 {
    [read /tmp, fstat *, read /tmp]
    [fstat *, read /tmp, fstat *]
}
G13 {
    [exec /bin/foo, fstat *, fstat /etc/passwd]
    [fstat *, fstat /etc/passwd, open /etc/passwd]
}
```

The two hundred strands result in a total of 32 distinct n-grams and 14 different groups. Each of the two hundred strands may be represented by combinations of the groups. Although the number of strands is two hundred, in the example embodiment, there are only thirteen different group arrangements. In other exemplary embodiments, in which system log 108 contains different amounts and types of log data, the number of group arrangements 701-713 may be any other number, depending on the content of system log 108. In addition to group arrangements A06, A12 and A10 already described above, there are ten further group arrangements, A01 thru A05, A07 thru A09, A11 and A13. These group arrangements 701-713, and the number of strands which consist of each of the group arrangements 701-713 are:

A01: [G4, G8]—12 strands
A02: [G3, G5, G9]—3 strands
A03: [G2, G3, G5, G9]—2 strands
A04: [G3, G6, G9]—20 strands
A05: [G4, G13]—9 strands
A07: [G2, G3, G6, G9]—24 strands
A08: [G4, G7, G13]—22 strands
A09: [G1, G11, G12]—4 strands
A11: [G5, G9, G14]—21 strands
A13: [G10, G11, G12]—41 strands At step 314, behavioral model program 300 combines distinct n-grams 401-432, the n-gram groups 501-514, and the n-gram group arrangements 701-713, to form a behavioral model. The behavioral model provides a view of the repetitive patterns in system log 108. In some embodiments of the present invention, the behavioral model includes identifiers for acceptable n-grams, distinct identifiers as n-gram groups, which are based on the identifiers of acceptable n-grams and n-gram arrangement identifiers, which are based on the distinct identifiers of n-gram groups. For example, in particular embodiments of the behavioral model, a list of acceptable n-grams is implemented as a hash table which maps n-grams (n events) to an identifier (integer). Also, in particular embodiments, n-gram groups are implemented as arrays of integers corresponding to n-gram identifiers. Each n-gram group has its own identifier, based on the integer identifiers of its component n-grams. Further, in particular embodiments, n-gram arrangements are implemented as arrays of integers corresponding to identifiers of n-gram groups. The method ends at step 316.

Compared with traditional n-gram models, embodiments of the present invention are much more resistant to mimicry attacks. Some embodiments also allow the detection of new types of anomalies. In addition to detecting wrong, previously unknown event sequences, some embodiments allow detection of sequences that are missing, but existed in the learning material of past system behavior. Embodiments of the present invention provide explicit, precise information, and allows fast detection of anomalous events, but require small amounts of system memory.

Figure 8A:
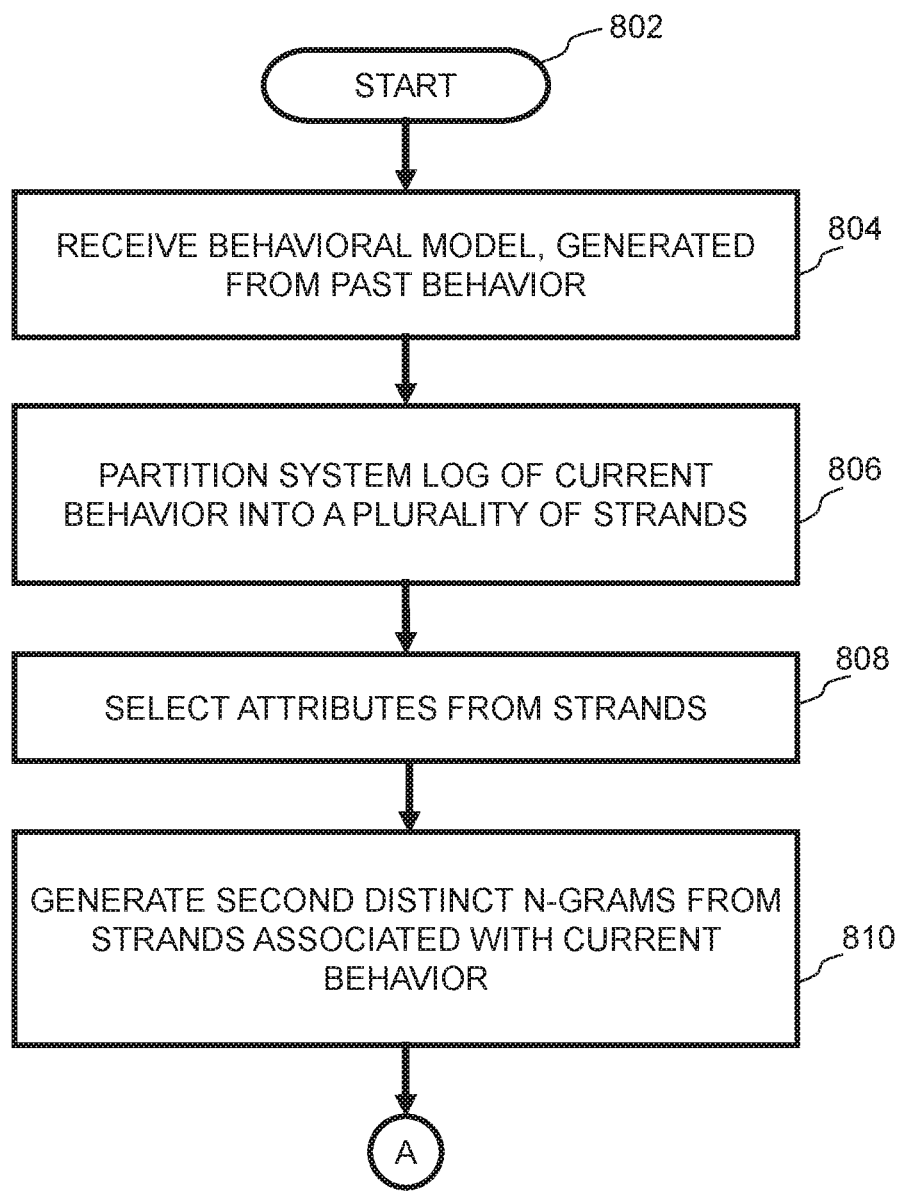
FIG. 8A shows an embodiment of an anomaly detection method, which detects anomalies between current activity and past activity in a computer system using the behavioral model generated in the embodiment of FIG. 3, in accordance with an embodiment of the present invention.

FIG. 8A is a flowchart of operations of anomaly detection method 800, which detects anomalies between current activity and past activity in a computer system using the behavioral model generated in the embodiment of FIG. 3, in accordance with an embodiment of the present invention. The method starts at step 802. At step 804, anomaly detection method 800 receives the behavioral model generated from the method of FIG. 3 from past behavior of the computer system 100. At step 806, anomaly detection method 800 partitions the current system log associated with current behavior (activity) into a plurality of strands. This is done in the same way as described above for past behavior with reference to step 304. At step 808, anomaly detection method 800 selects attributes from the strands generated at step 806. This is done in the same way as described above for past behavior with reference to step 306. At step 810, anomaly detection method 800 generates second distinct n-grams from the strands associated with current behavior of the current system log, and which were generated at step 806. This is done in the same way as described above for past behavior with reference to step 308. Steps 804 to 810 produce a behavioral model of the strands from operations of current activity behavior of computer system 100, which can then be matched to the behavioral model of past behavior provided at step 804.

Figure 8B:
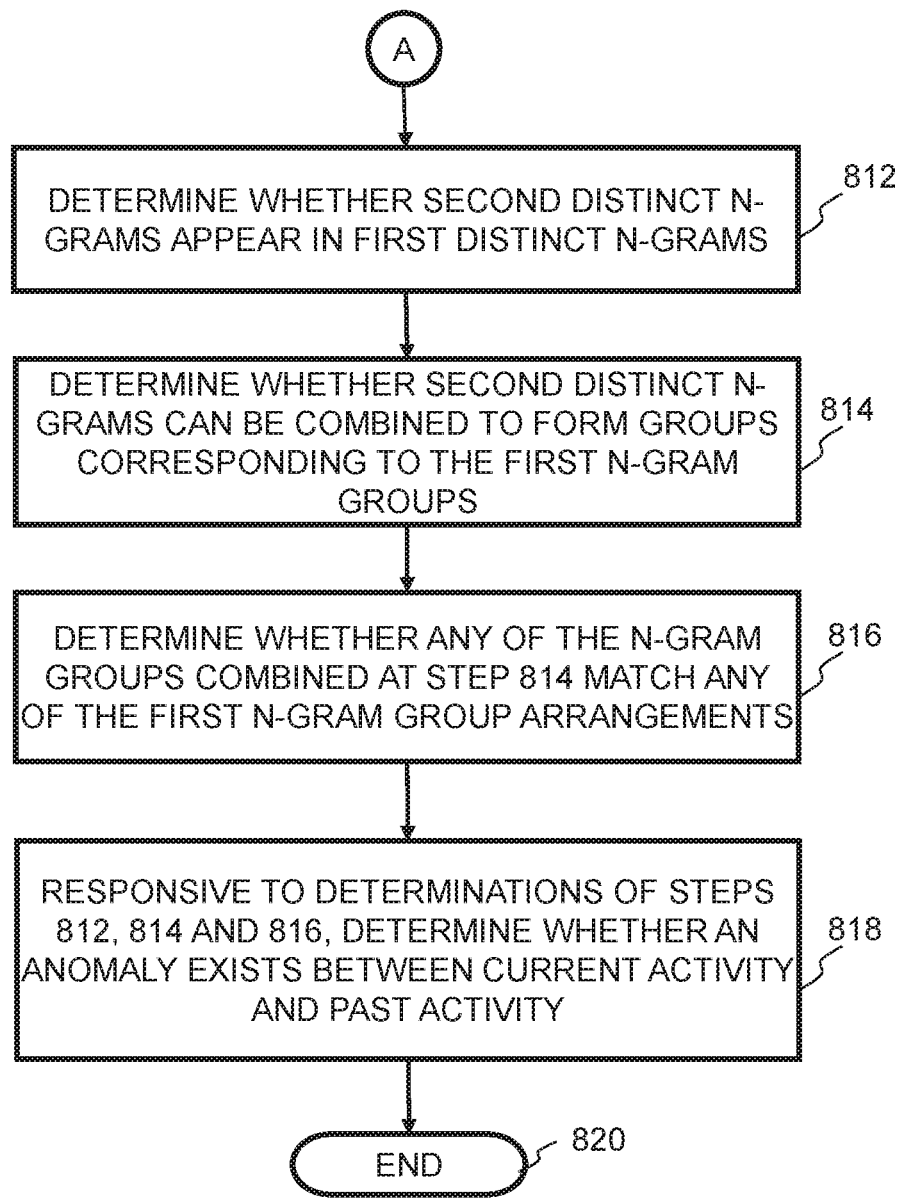
FIG. 8B shows an embodiment of an anomaly detection method, which detects anomalies between current activity and past activity in a computer system using the behavioral model generated in the embodiment of FIG. 3, in accordance with an embodiment of the present invention.

FIG. 8B is a flowchart of operations of anomaly detection method 800, which detects anomalies between current activity and past activity in a computer system using the behavioral model generated in the embodiment of FIG. 3, in accordance with an embodiment of the present invention. Referring to FIG. 8B, at step 812, anomaly detection method 800 determines for each of the second distinct n-grams, whether they appear in the list of first distinct n-grams 401-432. This determination corresponds to the prior art method, which just looks at individual n-grams to see if the are acceptable. In embodiments of the present invention, at step 814, anomaly detection method 800 determines whether the second distinct n-grams can be partitioned into any of the known first n-gram groups 501-514. This determination looks at whether groups of n-grams in the current activity strand to be matched, appear in the known n-gram groups of past computer behavior, and thus are less likely to be an anomaly. At step 816, anomaly detection method 800 determines whether any of the groups into which the second distinct n-grams were partitioned at step 814 match any of the known first n-gram group arrangements 701-713. This determination looks at whether group arrangements of n-grams in the strand to be matched appear in known group arrangements of the past behavior of computer system 100, and thus are less likely to be an anomaly.

At step 818, anomaly detection method 800, responsive to the previous determinations of steps 812, 814, and 816 determines whether an anomaly exists between the strand from which second distinct n-grams were generated at step 810 and the behavioral model of past behavior of computer system 100 provided at step 806. If the second distinct n-grams generated from the strand can be found in the first distinct n-grams 401-432, the second distinct n-grams can be combined into the known first n-gram groups 501-514, and if the groups into which the second distinct n-grams can be combined match any of the known first n-gram group arrangements 701-713, then the behavior of the strand being matched corresponds to known computer system 100 behavior and is not anomalous.

If the second distinct n-grams generated from the strand cannot be found in the first distinct n-grams 401-432, then the behavior is likely to be anomalous. This is the extent to which the prior art checks for anomalous behavior.

Embodiments of the present invention additionally consider if the second distinct n-grams generated from the strand can be found in the first distinct n-grams 401-432, but the second distinct n-grams cannot be combined into the known first n-gram groups 501-514, then the behavior of the strand being matched does not correspond to the known computer system 100 behavior, and is likely to be anomalous.

If the second distinct n-grams generated from the strand can be found in the first distinct n-grams 401-432 and the second distinct n-grams can be combined into the known first n-gram groups 501-514, but the groups into which the second distinct n-grams can be combined do not match any of the known first n-gram group arrangements 701-713, then the behavior of the strand being matched does not correspond to known computer system 100 behavior and is likely to be anomalous. The method ends at step 820.

Examples of the determinations of step 818 being made as to whether an anomaly exists between a current strand and a behavioral model of past behavior of a computer system will be briefly described. Individuals and organizations today perform much of their communication using third party services. An individual may use a social media service provider to communicate with friends. That service is typically provided free by the social media service provider. The service provider derives targeted advertising revenue using information that the individual has provided either during registration or during use of the social media service. The service provider is interested in weakening consumer privacy so as to better target the advertising. The consumer is interested in minimizing the advertisements seen and maximizing their privacy. The consumer may wish to track their "normal" behavior of interaction with the social media site and have this stored in a behavioral model of their past behavior. The consumer may then wish to monitor current interactions with the social media service in order to detect anomalies with past behavior, perhaps indicating behavior by the service provider that is at variance with the consumer's desires. This behavior by the service provider differs from a conventional attack on the consumer's privacy, since it is the party through which the consumer is interacting that is "attacking" the consumer, rather than an unrelated third party. The "attack" may be deliberate by the service provider trying to maximize advertising revenue or it may arise from a service provider whose computer systems have been compromised. By comparing a current strand derived from current behavior with the generated behavioral model of past behavior of the computer system, anomalies between the current behavior and the past behavior may be detected.

Once the anomalies are detected, then the consumer may be informed of the anomalous behavior or the consumer's computer system may even refuse to execute the actions in the current strand that is detected as anomalous.

In a first example, a consumer may use a photographic hosting and sharing service. The service allows users to upload and store their photographs, establish a network of friends with whom to share photographs, comment on photographs, and so forth. The service also provides activity tracking of the users and their friends. Users can view the actions they have performed (for example, the photographs they uploaded and when), and limited tracking of the actions of other users (for example, accesses and comments on the photographs they share).

Utilizing a system log to try and discover a behavioral model that represents the service provider behavior, it may be determined that the consumer logs-in, uploads two photographs, shares photographs with two other consumers who in turn view the photographs and comment on them. Generation of a behavioral model may show two, interleaving, transaction-like patterns of behavior. The consumer uploads a first photo, shares it with a first consumer who then views the first photo and comments on it. In the second, the same sequence of actions occur in relation to a second consumer sharing a second photo with a second user. Analysis identifies a simple transaction-style behavior in the log fragment:

<upload photo, share photo, view photo, comment photo>.

Further analysis of the system log of the consumer's interactions may determine other 'normal' behaviors such as:

1<self.upload photo, self.share photo, friend.view photo, friend.comment photo>

2<friend.upload photo, friend.share photo, self.view photo, self.comment photo>

3<friend.upload photo, self.view photo, self.comment photo>

4<other.connect request, self.accept connect request>

5<self.connect request, other.accept connect request>

These behaviors represent the consumer viewing photos shared by other users or connecting with friends. They are determined from the system log of the consumer and provide insight into the behavior of the service provider. The consumer and his/her friends' usage patterns and configuration, such as privacy settings are reflected in these behaviors. For example, the consumer uses the service's default privacy policy that considers newly upload photos as private. This requires him/her to explicitly share every photo before it is viewed by other users. Some of the consumer's friends have a similar configuration, and this is reflected in the second behavior. Other friends have configured their account differently to make all of their uploaded photos visible to their friends or public, by default. This behavior is captured in the third behavior, which lacks an explicit sharing operation.

Suppose now that the photo hosting service wishes to attract additional traffic and increase the amount of content that is available to their users. To do this, they decide to change their default application behavior. The change is to make all new content visible to the user's friends by default. Users can still configure the policy explicitly in order to override the default behavior. Unaware of the new default setting, the consumer continues to use the service and uploads new images. The consumer's friends may now see the image instantly, without the consumer's explicit action to share. This change is made to only the default behavior of the application. It does not modify application's terms of use nor the privacy policy. The consumer still has the right to restrict his/her content, configure his/her policy differently, or remove any of his/her content. While this provider change may be done entirely legally it has a negative effect on the consumer's use of the application.

The consumer's set of normal behaviors may be used to detect this application change. The behavioral model of these has been generated using embodiments of the invention described above. The consumer's service provider, after the change, will start generating logs that cannot be matched to the behaviors described above. This unrecognized activity may be considered an anomaly and alert the consumer to investigate the change. A new behavior, in which other consumers view and comment on a photo before it has been explicitly shared, may be detected:

<self.upload photo, friend.view photo, friend.comment photo>.

This anomaly is specific to the consumer's interaction with the service. For other consumers, such as those whose photos are shared with others by default, the change has no impact. For such users, the above behavior would already be considered an acceptable behavior, based on their behavioral model. Once the anomalous new behavior has been detected, the consumer may be informed or the consumer's computer system may even refuse to execute the actions in the current strand that is detected as anomalous.

In a second example, the consumer uses an additional service provider: an on-line photo printing service. Using this service the consumer can order prints of his/her photos online and have them delivered to friends and family. The service is integrated with the consumer's photo hosting provider. This is convenient for the consumer as he/she can give the printing site permission to access his/her photo and order prints without the need to re-upload. In a typical scenario, the consumer accesses the printing service, and selects his/her hosting service as the location of images. The printing service accesses the consumer's account and downloads photo miniatures. The consumer selects the photo or photos that he/she wants printed and for each of them the printing service, with its delegated authority from the photo sharing service, downloads the full size image files.

The logs (visible to the consumer) now contain log events which originate from two different service providers, distinguished by a new event attribute provider in the logs. In addition, events for actions performed on behalf of the consumer by the printing service provider have a context attribute value "prtsvc" in the hosting provider log. The consumer has given the printing service a permission to access his/her photos. While short-lived permission delegations are possible, many providers offer long-lived offline permissions, which are often requested by the third-party providers, such as the on-line photo printing service, irrespective of the dangers. The expected behavior is that the service will only access the photos when the consumer places a print order. Technically however, there is no such restriction and the print service may access the photos at any time. The consumer can only trust that this service provider will behave properly.

Analyzing the hosting service log in isolation the following behavior may be discovered:

<prtsvc.list photos, prtsvc.get thumbnail, prtsvc.get full-size>

This behavior represents the typical way in which a print service accesses user photographs when interacting with the hosting service. With its delegated permission from the consumer, the printing service could decide to download all of the consumer's photos in the background without interaction with the consumer. This activity will generate a log in the hosting service. Based on the behavior above, however, this activity can be regarded as "normal". Building a behavioral model from the individual printer service log is insufficient to fully capture the interaction between consumer and the two providers. The behaviors should be discovered from a single log that aggregates the events from both service providers. In this case, log operations are characterized in terms of three attributes: provider.context.action with a sample behavior:

<print.self.new order, host.prtsvc.list photos, host.prtsvc.get thumbnail, print.self.select, host.prtsvc.get full-size, print.self.complete order>

This behavior captures aggregated behavior of all of the parties collaborating together. Any activity of printing service unrelated to the consumer's print ordering will be considered abnormal, as it will not match the normal behavior. Once the anomalies are detected, then the consumer may be informed of the anomalous behavior or the consumer's computer system may even refuse to execute the actions in the current strand that is detected as anomalous.

Figure 9:
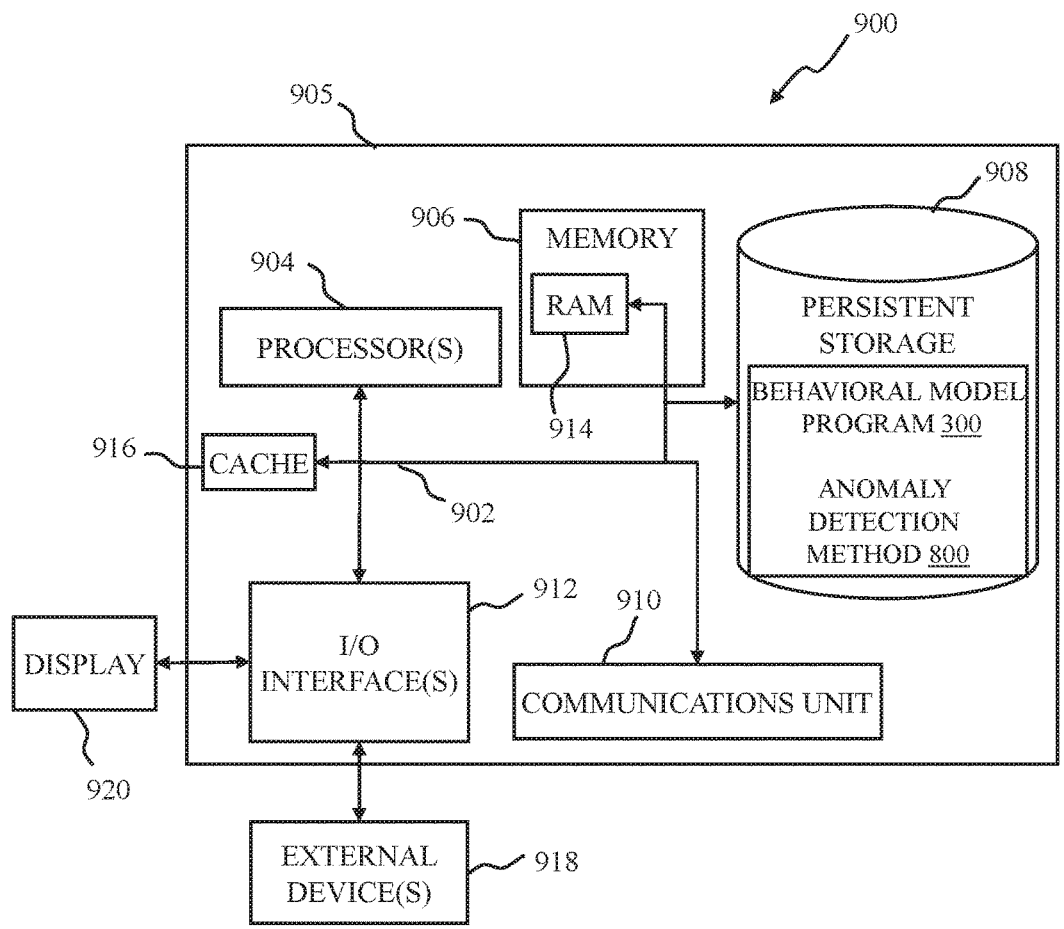
FIG. 9 depicts a block diagram of components of computer system 900, capable of operating the behavioral model generation and anomaly detection methods, in accordance with an illustrative embodiment of the present invention.

FIG. 9 depicts a block diagram of components of computer system 900, including computing system 905, hosting methods 300 and 800, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computing device 905 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM) 914 and cache memory 916. In general, memory 906 can include any suitable volatile or non-volatile computer readable storage media.

Generate behavior model 300 and anomaly detecting method 800 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices, including resources of enterprise computer system 100 and computer system 900. In these examples, communications unit 910 includes one or more network interface cards. Communications unit 910 may provide communications through the use of either or both physical and wireless communications links. Generate behavior model 300 and anomaly detecting method 800 may be downloaded to persistent storage 908 through communications unit 910.

I/O interface(s) 912 allows for input and output of data with other devices that may be connected to computing device 905. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., generate behavior model 300 and anomaly detecting method 800, can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method of generating a behavioral model of a computer system, the computer system having a system log that records activities generated by a plurality of processes executing on the computer system, the method comprising the steps of:
   one or more processors partitioning the system log into a plurality of strands, each strand including activities that share a common attribute, the activities included as past activities of the computer system;
   the one or more processors selecting attributes from the plurality of strands;
   the one or more processors generating first distinct n-grams, each n-gram comprised of attributes from successive activities within a strand;
   the one or more processors generating a first plurality of n-gram groups, each n-gram group including a plurality of the first distinct n-grams in which a first one of the plurality of first distinct n-grams coexists in a strand also containing a second one of the plurality of first distinct n-grams;
   the one or more processors generating a first plurality of n-gram group arrangements, each n-gram group arrangement including a plurality of n-gram groups, each of the n-gram groups being found, in combination, in at least one strand, and wherein a first set of integers respectively identifies the first plurality of distinct n-grams, an array of integers of the first set of integers that respectively correspond to the first plurality of distinct n-grams identifies an n-gram group of the first plurality of n-gram groups, and the first plurality of n-gram group arrangements are represented by arrays of n-gram group integer arrays, each n-gram group integer corresponding to an array of integers of an n-gram group of the first plurality of n-gram groups;
   the one or more processors generating a behavioral model based on the past activity of the computer system, wherein the behavioral model contains the first distinct n-grams, the first plurality of n-gram groups, and the first plurality of n-gram group arrangements; and
   the one or more processors determining whether an anomaly of current activity occurs in the computer system, based on generating a plurality of second distinct n-grams, a second plurality of n-gram groups, and a second plurality of n-gram group arrangements from attributes of partitioned strands of current activity of the computer system, applied to the behavior model.

2. The method of claim 1, wherein the first distinct n-grams are represented in a hash table mapping each n-gram into an identifier.

3. The method of claim 1, wherein the first plurality of n-gram groups are represented by an array of integers corresponding to n-gram identifiers, each n-gram group having its own identifier.

4. The method of claim 1, wherein the plurality of n-gram groups represent common sequences of first distinct n-grams appearing at the start of a process or common end sequences of first distinct n-grams appearing at the end of a process.

5. The method of claim 1, wherein determining whether an anomaly of activities occurs in the computer system, based on the behavioral model, comprises the steps of:
   the one or more processors partitioning the system log, associated with recorded activities of current activity of the computer system, into a plurality of strands;
   the one or more processors generating the plurality of second distinct n-grams from the plurality of strands associated with the current activity of the computer system;
   the one or more processors generating the second plurality of n-gram groups, each n-gram group including a plurality of the second distinct n-grams in which a first one of the plurality of second distinct n-grams coexists in a strand also containing a second one of the plurality of the second distinct n-grams;
   the one or more processors generating the second plurality of n-gram group arrangements, each n-gram group arrangement including a plurality of n-gram groups, each of the n-gram groups contained, in combination, in at least one strand associated with the current activity of the computer system;
   the one or more processors determining whether an anomaly exists between the current activity of the computer system and the past activity of the computer system, based on one or more of: the second distinct n-grams appearing in the first distinct n-grams, the second plurality of n-gram groups appearing the first plurality of n-gram groups, and the second plurality of n-gram group arrangements appearing in the first plurality of n-gram group arrangements; and
   the one or more processors, responsive to a determination that an anomaly exists between the current activity and the past activity, providing an indication of the detection of the anomaly to an end user of the computer system.

6. The method of claim 5, wherein the determination that an anomaly exists includes at least one second distinct n-gram that is absent in the first distinct n-grams, and at least one of: a second n-gram group of the second plurality of n-gram groups, which is absent in the first plurality of n-gram groups, and a second n-gram arrangement of the plurality of second n-gram group arrangements, which is absent in the first plurality of n-gram arrangements.

\* \* \* \* \*